(12) United States Patent
Bartholomeyzik et al.

(10) Patent No.: US 7,150,846 B2
(45) Date of Patent: Dec. 19, 2006

(54) BIPOLAR PLATE AND METHOD OF FABRICATING IT

(75) Inventors: Willi Bartholomeyzik, Hassloch (DE); Gerhard Bohrmann, Böhl-Iggelheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 168 days.

(21) Appl. No.: 10/740,757

(22) Filed: Dec. 22, 2003

(65) Prior Publication Data

US 2004/0131914 A1 Jul. 8, 2004

(30) Foreign Application Priority Data

Dec. 23, 2002 (DE) .................... 102 61 483

(51) Int. Cl.
B29C 70/86 (2006.01)
B29C 70/88 (2006.01)
H01M 8/02 (2006.01)

(52) U.S. Cl. ............... 264/257; 264/258; 264/261; 264/271.1; 264/328.1; 264/339

(58) Field of Classification Search .......... 264/257, 264/261, 271.1, 328.1, 339
See application file for complete search history.

(56) References Cited

U.S. PATENT DOCUMENTS 4,900,643 A * 2/1990 Eskra et al. ............... 429/141
6,071,635 A * 6/2000 Carlstrom, Jr. ............. 429/34
6,300,001 B1 10/2001 Hornung et al.
2004/0053104 A1 * 3/2004 Novkov et al. ............ 429/34

FOREIGN PATENT DOCUMENTS

| GB | 2 326 017 | 12/1998 |
| WO | 98/33224 | 7/1998 |
| WO | 98/53514 | 11/1998 |

OTHER PUBLICATIONS

Brennstoffzellen-Antrib, 2000.

* cited by examiner

Primary Examiner—Stefan Staicovici
(74) Attorney, Agent, or Firm—Novak Druce & Quigg, LLP

(57) ABSTRACT

The invention relates to a method of fabricating a bipolar plate for fuel cell stacks, wherein the bipolar plate includes a circumferential frame made of an electrically non-conductive material and further includes an inner bipolar plate region which is enclosed by the frame, is made of the electrically non-conductive material and comprises channels for gases and, if required, for coolants, said method comprising the following procedural steps: A) Inserting an electrically conductive fabric into a tool for fabricating the bipolar plate, B) Introducing the electrically non-conductive material into the tool in order to form the frame and the inner bipolar plate region (3), the electrically non-conductive material extending through the fabric, C) Removing a molded bipolar plate from the tool, and D) Bending back the fabric on both sides which extends beyond the inner bipolar plate region so as to cause the fabric to cover the inner bipolar plate region made of the non-conductive material.

8 Claims, 5 Drawing Sheets

BIPOLAR PLATE AND METHOD OF FABRICATING IT

Figure 1:
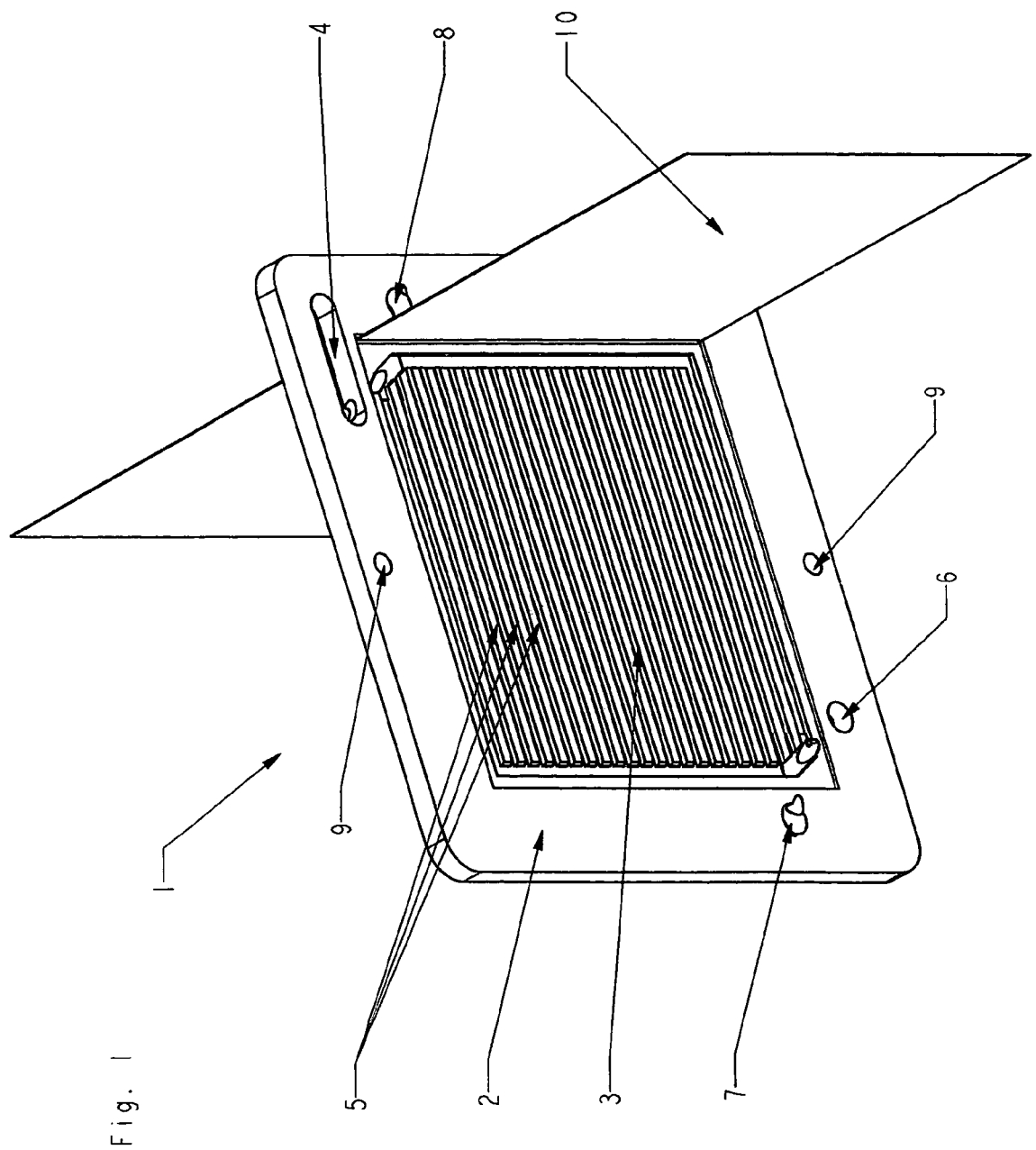

The present invention relates to a bipolar plate for fuel cell stacks and to a method of fabricating the bipolar plate.

The means of propulsion in motor vehicles hitherto have predominantly been internal combustion engines requiring petroleum products as the fuel. As petroleum resources are limited and the combustion products can have an adverse effect on the environment, research in recent years has increasingly been directed at alternative propulsion schemes.

The utilization of electrochemical fuel cells for mobile and stationary energy supply means is meeting with increased interest in this context. Fuel cells are energy converters which convert chemical energy into electrical energy. The fuel cell inverts the electrolytic principle.

At present, various types of fuel cells exist, whose principle of operation is generally based on the electrochemical recombination of hydrogen and oxygen to give water as the end product. They can be categorized according to the type of the conductive electrolyte used, the operating temperature level and the achievable output ranges. Particularly suitable for use in motor vehicles are polymer-electrolyte-membrane fuel cells. They are usually operated at a temperature in the range from 50 to 90° C. As the voltage of an individual cell is far too low for practical applications, it is necessary for a plurality of such cells to be connected in series to form a fuel cell stack. At present, in a complete stack, PEM fuel cells usually supply electrical power in the range from 1 to 75 kW (cars) and up to 250 kW (utility vehicles, buses).

In a PEM fuel cell, the electrochemical reaction of hydrogen with oxygen to produce water is divided into the two substeps reduction and oxidation by the insertion of a proton-conducting membrane between the anode electrode and the cathode electrode. This entails a separation of charges which can be utilized as a voltage source. Such fuel cells are summarized, for example, in "Brennstoffzellen-Antrieb, innovative Antriebkonzepte, Komponenten und Rahmenbedingungen [Fuel Cell Propulsion, Innovative Propulsion Schemes, Components and Constraints]", paper at the specialist conference of IIR Deutschland GmbH, May 29 to 31, 2000, Stuttgart.

An individual PEM fuel cell is of symmetric design. Arranged successively on both sides of a polymer membrane are one catalyst layer and one gas distribution layer each, followed by a bipolar plate. Current collectors are used to tap off the electrical voltage, while end plates ensure that the reactant gases are metered in and the reaction products are removed.

In a fuel cell stack, a multiplicity of cells is stacked with respect to one another in an electrical series, being separated from one another by an impermeable, electrically conductive bipolar plate which is referred to as the bipolar plate. In such an arrangement, the bipolar plate bonds two cells mechanically and electrically. As the voltage of an individual cell is in the range around 1 V, practical applications require numerous cells to be connected in series. Often, up to 400 cells, separated by bipolar plates, are stacked on top of one another, the stacking arrangement of the cells being such that the oxygen side of the one cell is joined to the hydrogen side of the next cell via the bipolar plate. Here, the bipolar plate satisfies a number of functions. It serves for electrical interconnection of the cells, for supplying and distributing reactants (reactant gases) and coolant, and for separating the gas compartments. In this context, a bipolar plate must satisfy the following characteristics:

chemical resistance to humid oxidative and reductive conditions
gas tightness
high conductivity
low contact resistances
dimensional stability
low costs in terms of material and fabrication
no design restrictions
high stability under mechanical loads
corrosion resistance
low weight.

At present, three different types of bipolar plates are in use. Firstly, metal bipolar plates are employed which are composed, for example, of alloy steels or coated other materials such as aluminum or titanium.

Metallic materials are distinguished by high gas tightness, dimensional stability and high electrical conductivity.

Graphite bipolar plates can be given a suitable shape by compression-molding or milling. They are distinguished by chemical resistance and low contact resistances, but in addition to high weight have inadequate mechanical performance.

Composite materials are composed of special plastics which include conductive fillers, e.g. based on carbon.

WO 98/33224 describes bipolar plates made of ferrous alloys which include high proportions of chromium and nickel.

GB-A-2 326 017 discloses bipolar plates made of plastic material, which are rendered conductive by electroconductive fillers such as carbon powder. In addition, a superficial metal coating can be present which, via the edges of the bipolar plate, enables an electroconductive connection between two cells.

According to WO 98/53514, a polymer resin is treated by incorporating an electroconductive powder and a hydrophilizer. Polymer compounds filled with silicon dioxide particles and graphite powder are used as bipolar plates. In particular, phenol resins are used for this purpose.

Bipolar plates made of electrically non-conductive materials, for example thermoplastic bipolar plates, are rendered conductive in the prior art by various methods. For example, an electrically conductive filler such as carbon powder, carbon fibers or metal particles, e.g. powders or shavings of titanium, aluminum, stainless steel, silver, gold etc. is added to the electrically non-conductive material. A drawback of this approach is that the modification of e.g. a polymer with a conductive filler has an adverse impact on material characteristics of the polymer, (e.g. castability, mechanical characteristics).

As bipolar plates are critical functional elements of fuel cell stacks, which make a considerable contribution to the costs and the weight of the stack, there is great demand for bipolar plates which meet the abovementioned requirement profile and avoid the drawbacks of the known bipolar plates. In particular, uncomplicated and cost-effective fabrication of bipolar plates should be feasible.

The object of the invention is achieved by a method of fabricating a bipolar plate for fuel cell stacks, wherein the bipolar plate includes a circumferential frame made of an electrically non-conductive material and further includes an inner bipolar plate region which is enclosed by the frame, is made of the electrically non-conductive material and comprises channels for gases and, if required, for coolants, said method comprising the following procedural steps:

A) The insertion of an electrically conductive fabric, which essentially extends in two dimensions, into a tool for fabricating the bipolar plate, the fabric being inserted essentially perpendicularly to the orientation of the bipolar plate to be fabricated and extending on both sides beyond the bipolar plate to be fabricated, B) The introduction of the electrically non-conductive material into the tool in order to form the frame and the inner bipolar plate region, the electrically non-conductive material extending through the fabric, C) The removal of the molded bipolar plate from the tool, and D) Bending back on both sides the fabric which extends beyond the inner bipolar plate region so as to cause it to cover the inner bipolar plate region made of the non-conductive material.

The present invention further relates to a bipolar plate for fuel cell stacks which comprises a circumferential frame made of an electrically non-conductive material and further includes an inner bipolar plate region which is enclosed by the frame, is made of the electrically non-conductive material and comprises channels for gases and, if required, for coolants and which is covered on both sides by a large proportion of the volume of an electrically conductive fabric essentially extending in two dimensions, the fabric being contained with a smaller proportion of its volume in the electrically non-conductive material of the inner bipolar plate region for the purpose of providing through-contacts.

A fuel cell stack in this context is to be understood as a stack comprising at least two individual cells in each case separated by the bipolar plates. Such fuel cell stacks are fabricated by repeatedly stacking bipolar plate, gas distribution layer, catalyst layer, polymer membrane, catalyst layer and gas distribution layer on top of one another. At both ends, a stack has one electrically conductive electrode plate each instead of a bipolar plate.

The bipolar plate according to the invention includes a circumferential frame and an inner bipolar plate region which is enclosed by the frame and is made of an electrically non-conductive material. This design of the bipolar plate results in a separation of functions. The frame serves to define the feed channels and discharge channels contained therein for gases and coolants. Moreover, the bipolar plates according to the invention combined with membrane-electrode assemblys can be compression-bonded to one another via the bipolar plate frames and can be mounted in a housing without additional insulation, this having the advantage that no leakage currents or short circuits will occur between the bipolar plates. By means of the electrically conductive fabric, the inner bipolar plate region ensures electrical conductivity of the bipolar plate according to the invention. Moreover, on its surfaces it has channels for gases, the so-called flow-field, which distributes the gaseous reactants (e.g. hydrogen and oxygen) across the anode surface and cathode surface respectively.

In addition, the inner bipolar plate region has channels for coolants in its interior. The individual cells of a stack must be cooled as the power density increases. In many cases, straight air cooling is not sufficient, given the limited heat transfer. Liquid cooling, involving a cooling circuit comparable to an internal combustion engine, therefore becomes necessary. Cooling is consequently performed directly on the active cell face (inner bipolar plate region) or locally at the through-connection points, thus achieving optimum heat dissipation.

Gases and liquids are preferably fed to the inner bipolar plate region via channels in the frame of the bipolar plate and are discharged again via further channels in the frame.

In step A) of the method according to the invention, an electrically conductive fabric is inserted into a tool for fabricating the bipolar plate in such a way that it is oriented perpendicularly to the bipolar plate to be fabricated and extends beyond it on both sides. A fabric in this context is to be understood as wire webs or filament webs whose wires or filaments made of electrically conductive material are braided together, knotted together or linked together by some other prior art method. This also includes the option of a plurality of plies of the wire webs or filament webs being stacked on top of one another and bonded together.

Then, in step B), an electrically non-conductive material is introduced into the tool to fabricate the frame and the inner bipolar plate region. The entire bipolar plate is consequently molded essentially integrally from the electrically non-conductive material, the inner bipolar plate region being rendered electrically conductive with the aid of the fabric. After step B) of the method according to the invention has been carried out, the frame and inner bipolar plate region are oriented perpendicularly to the fabric, the fabric penetrating through the inner bipolar plate region and projecting therefrom on both sides.

After the bipolar plate formed up to this point has been removed from the tool in step C), the fabric is bent back on both sides in step D), so that it covers the electrically non-conductive material on both sides in the inner bipolar plate region. Advantageously, on the one hand, this ensures electrical through-connections through the non-conductive inner bipolar plate region, as the fabric extends therethrough from the anode side to the cathode side, and on the other hand, the electrons liberated in the course of the fuel cell reaction are collected along the entire surface of the bipolar plate region via the electrically conductive fabric.

A further advantage of the fabric is that in a polymer-electrolyte membrane (PEM) fuel cell stack it assumes a mechanical support function for the polymer-electrolyte membrane. During fuel cell operation, the membrane can be subject to pressure differentials between its two surfaces, as a result of which, in the prior art, it may be forced on one side against the channels (the flow-field) formed in the inner bipolar plate region and may as a result become damaged. The electrically conductive fabric in the bipolar plate according to the invention supports the polymer-electrolyte membrane, as a result of which a thinner membrane can be used than in the prior art, or the membrane will withstand higher pressure differentials than in the prior art.

In a preferred embodiment of the present invention, the fabric, having been bent back in step D) of the method according to the invention, is at least partially fastened to the inner bipolar plate region made of non-conductive material. For example, the fabric can be fixed along the outer edge of the inner bipolar plate region by means of a thermal process, e.g. hot riveting. This ensures that the fabric is fastened to the bipolar plate in a stable manner.

In a preferred embodiment of the present invention, the non-conductive material is a thermoplastic or a thermosetting plastic. Here, all reinforced and non reinforced thermoplastics or thermosetting plastics can be used which are chemically stable under humid oxidizing and reductive conditions like those prevailing in fuel cells. In addition, they should be gastight and dimensionally stable. The non-conductive material is preferably a polymer from the group consisting of polyphenylene sulfide (PPS), liquid crystal polyester (LCP), polyoxymethylene (POM), polyaryletherketone (PAEK), polyamide (PA), polybutylene terephthalate (PBT), polyphenylene oxide (PPO), polypropylene (PP) or polyethersulfone (PES). In general, preference is given to low-cost, readily workable, commercially available materials, as this will result in low fuel cell manufacturing costs.

In a preferred embodiment of the present invention, the electrically non-conductive material in step B) of the method according to the invention, is introduced into the tool for fabricating the bipolar plate by means of injection molding. Injection molding is a process which allows complex-geometry parts to be fabricated in their finished shape in a single process step. Since little or no finishing is necessary, and the production of injection-molded parts can be carried out in short cycle times, injection molding is definitely a mass production process. The method according to the invention involves, for example, one of the abovementioned polymer materials being cast into a mold in which a metal mesh is already present perpendicular to the casting direction. If the polymer material is cast directly through the metallic fabric, a gastight polymer wall extending through the fabric is produced.

Other possible methods of molding the frame and the inner bipolar plate region in step B) of the method according to the invention include pressure molding, transfer molding and sintering.

One advantage of the method according to the invention is therefore that low-cost fabrication of the bipolar plate is made possible, for example, by transfer molding and from a mass-produced material. Moreover, the positive characteristics of the non-conductive material (for example a polymer) are combined with those of the electrically conductive fabric (e.g. a metal wire mesh). Employing the electrically non-conductive material both for the frame and the inner bipolar plate region allows the bipolar plate to be molded integrally and essentially in a single process step at low cost. All that is necessary then, to finish the bipolar plate, is for the fabric to be bent back. Moreover, using the non-conductive material for the fabrication of frames and the inner bipolar plate region makes it possible to produce almost any geometry (for example channels for gases and coolants within the frame and in the inner bipolar plate region). Applying injection molding to plastic material, in particular, allows even complex geometric structures to be fashioned three-dimensionally. For example, to achieve uniform gas distribution on the surface of the inner bipolar plate region, the flow-field can contain meandrous channels. By means of the electrically conductive fabric it is possible to achieve simple through-connections with high electrical conductivity.

In a preferred embodiment of the present invention, the electrically conductive fabric is a wire mesh made of at least one material from the group consisting of nickel (pure), nickel alloys or high-alloy steel. The most important alloy elements for steel in this context are Al, B, Bi, Co, Cr, Cu, La, Mn, Mo, Ni, Pb, Se, Si, Te, V, W and Zr.

In the bipolar plate according to the invention, the inner bipolar plate region made of the non-conductive material is covered on both sides by a major proportion of the volume of an electrically conductive fabric which essentially extends in two dimensions, the fabric being contained, to a smaller proportion of its volume, in the electrically non-conductive material of the inner bipolar plate region to provide through-connections. In this arrangement, that proportion of the fabric which covers the non-conductive material serves to conduct electrons liberated during the fuel cell reaction. That proportion of the fabric which is contained in the non-conductive material penetrates the latter and thus ensures a through-connection from the one side of the bipolar plate to its other side. Preferably, that large proportion of the fabric which covers the inner bipolar plate region on both sides is joined via bending edges to that smaller proportion of the fabric which is contained in the electrically non-conductive material of the inner bipolar plate region. The bipolar plate according to the invention is preferably fabricated in accordance with the method according to the invention.

The bipolar plates according to the invention can be used, for example, in fuel cell stacks for supplying power in mobile and stationary facilities. Apart from domestic supplies, possible options include, in particular, power supplies of vehicles such as land vehicles, watercraft and aircraft as well as autarkic systems such as satellites, measuring stations or signal devices.

The present invention further relates to a method of fabricating a bipolar plate for fuel cell stacks, wherein the bipolar plate includes a circumferential frame made of an electrically non-conductive material and further includes an inner bipolar plate region which is enclosed by the frame, is made of the electrically non-conductive material and comprises channels for gases and, if required, for coolants, said method comprising the following procedural steps:

i) Forming the frame and the inner bipolar plate region made of the electrically non-conductive material, at least one gap being introduced into the inner bipolar plate region, ii) The insertion of an electrically conductive fabric, which essentially extends in two dimensions, into the at least one gap, so that the fabric is inserted essentially perpendicularly to the orientation of the bipolar plate to be fabricated and extending on both sides beyond the bipolar plate to be fabricated, iii) Bending back on both sides the fabric which extends beyond the inner bipolar plate region so as to cause it to cover the inner bipolar plate region made of the non-conductive material, iv) Closing the at least one gap with immobilization of the fabric extending through the gap by gastight back-filling with a material.

In this method, the electrically non-conductive material does not extend through the fabric as soon as the frame and the inner bipolar plate region have been molded, the fabric instead being inserted subsequently into at least one gap in the inner bipolar plate region and the gap then being back-filled gastightly with a material. The frame and the inner bipolar plate region are preferably molded in an injection-molding process. The at least one gap can in that case be present beforehand in the injection-molded part or be introduced thereinto subsequently, e.g. by machining. The material used for back-filling can, e.g. be an adhesive known in the prior art or the electrically non-conductive material from which the frame and the inner bipolar region are molded. The preferred embodiments of this method according to the invention (comprising the steps i to iv) essentially correspond to the abovementioned preferred embodiments of the above-mentioned method according to the invention (comprising the steps A to D).

Figure 2:
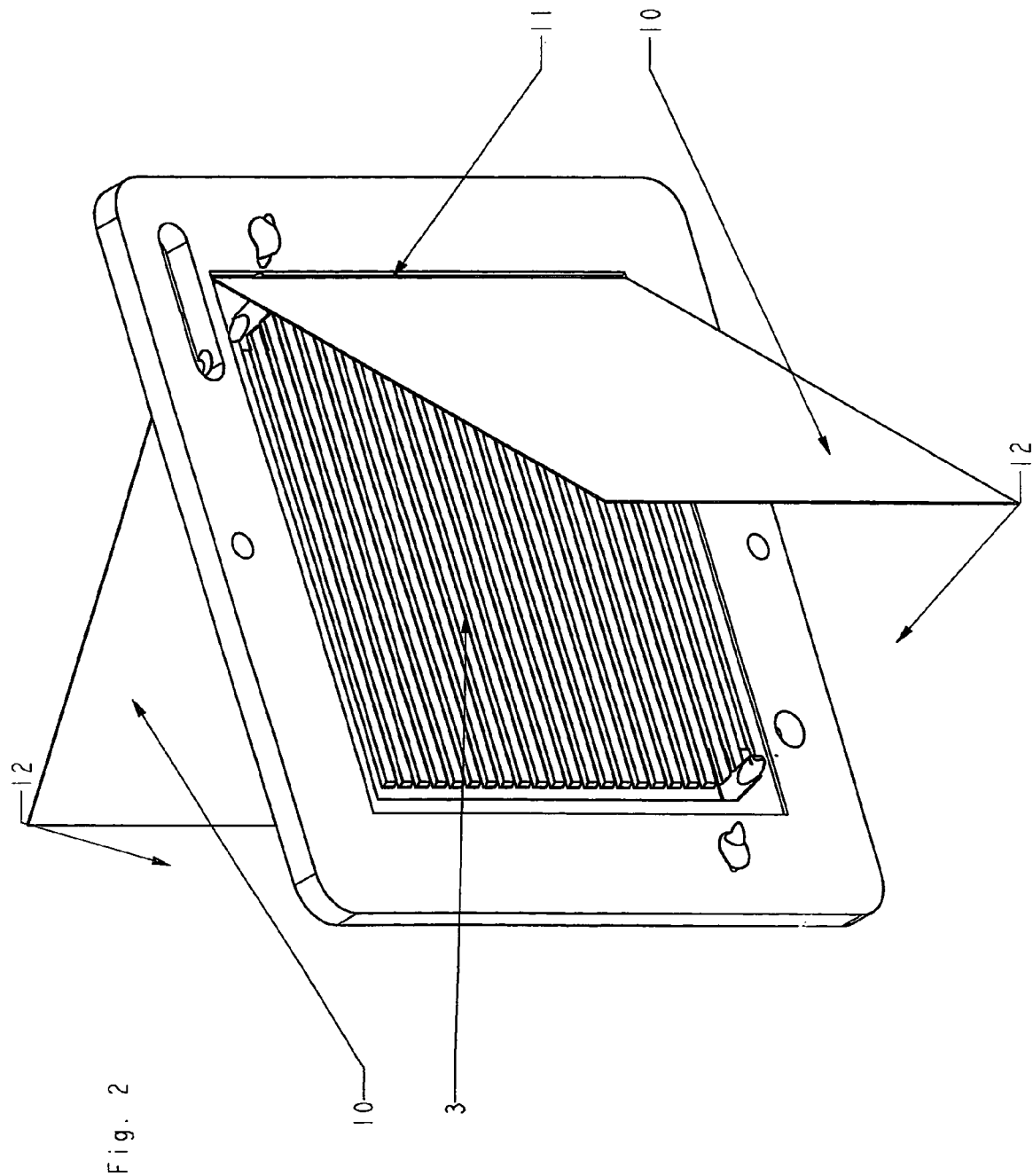
Figure 3:
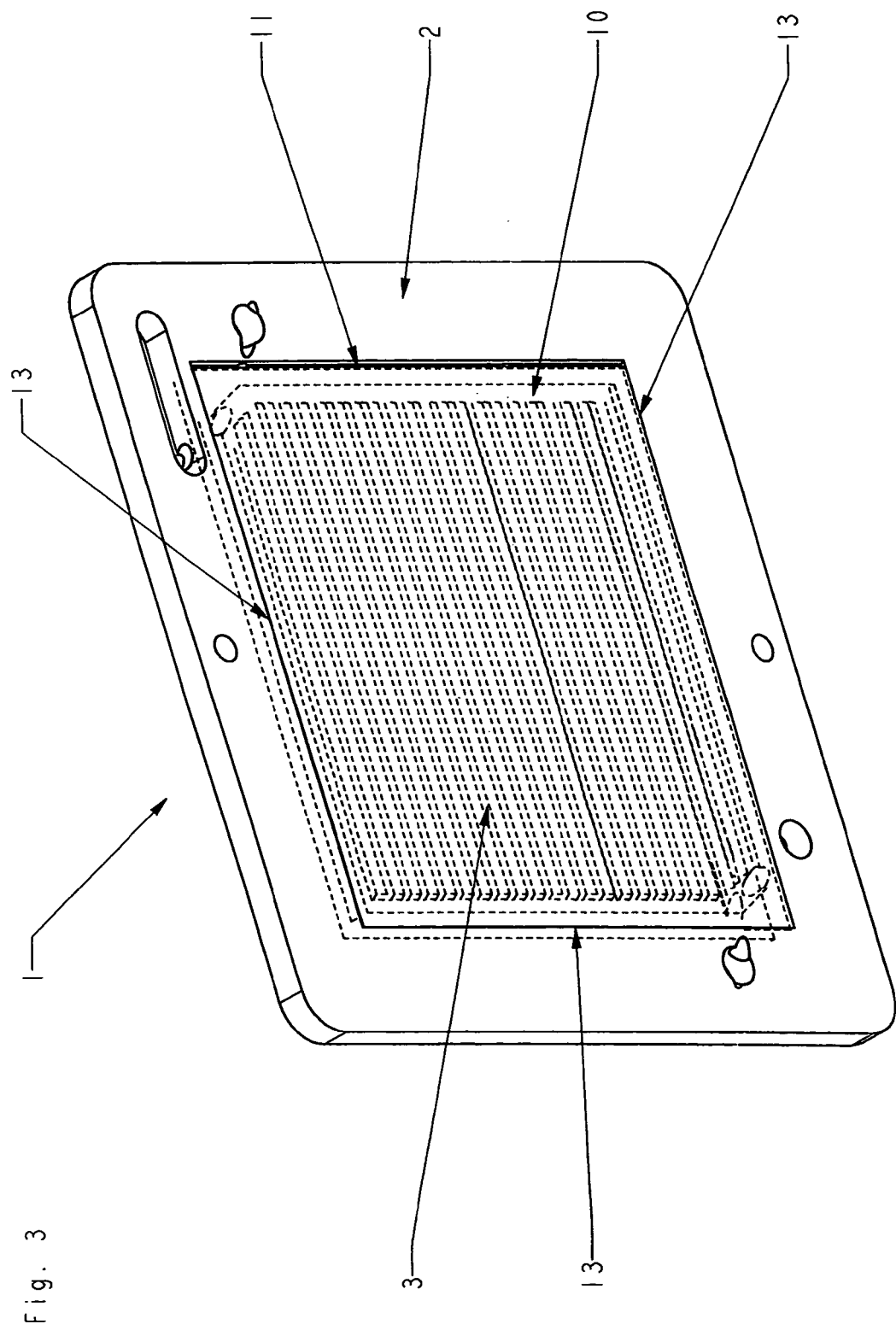
Figure 4:
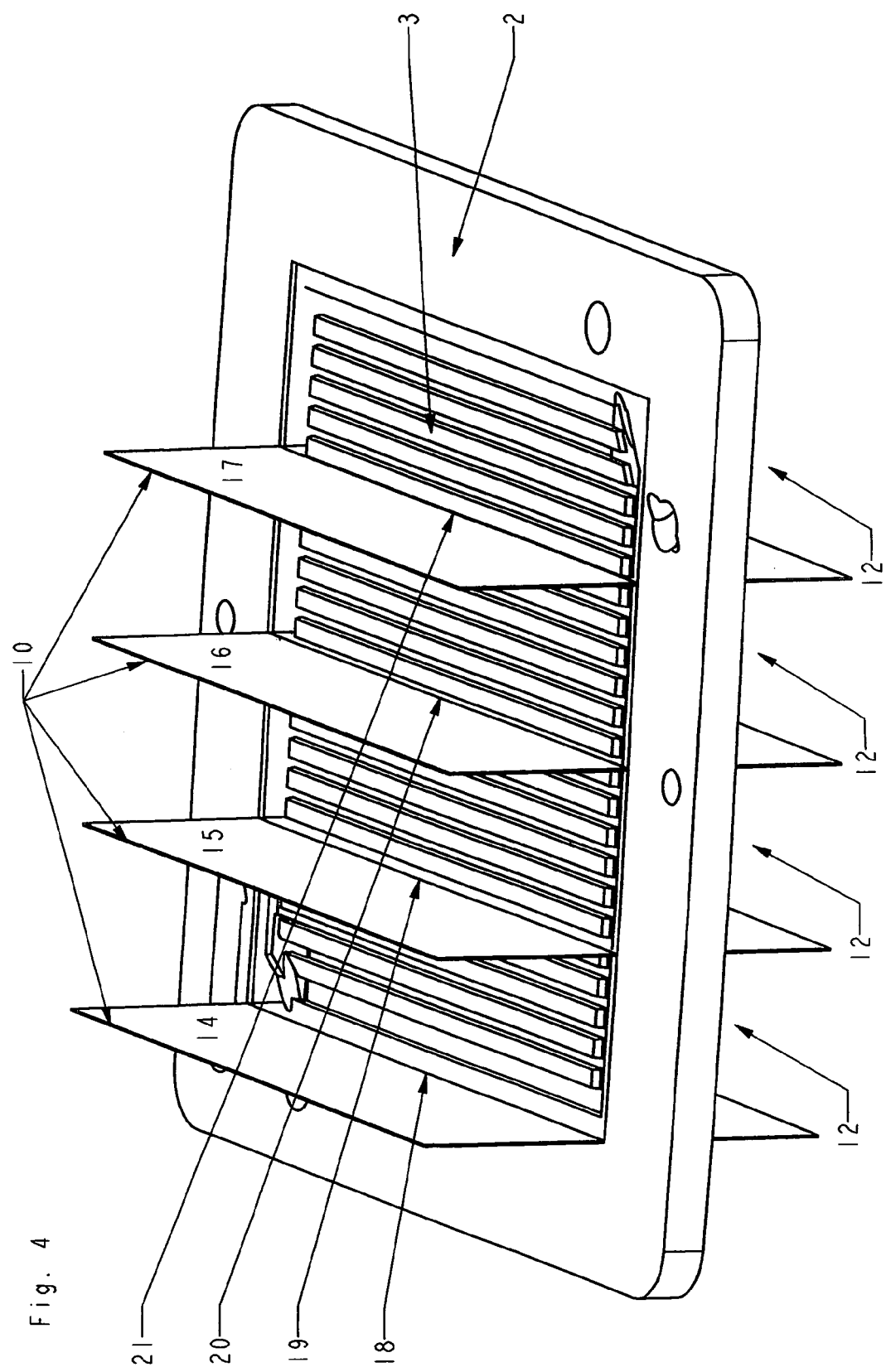
Figure 5:
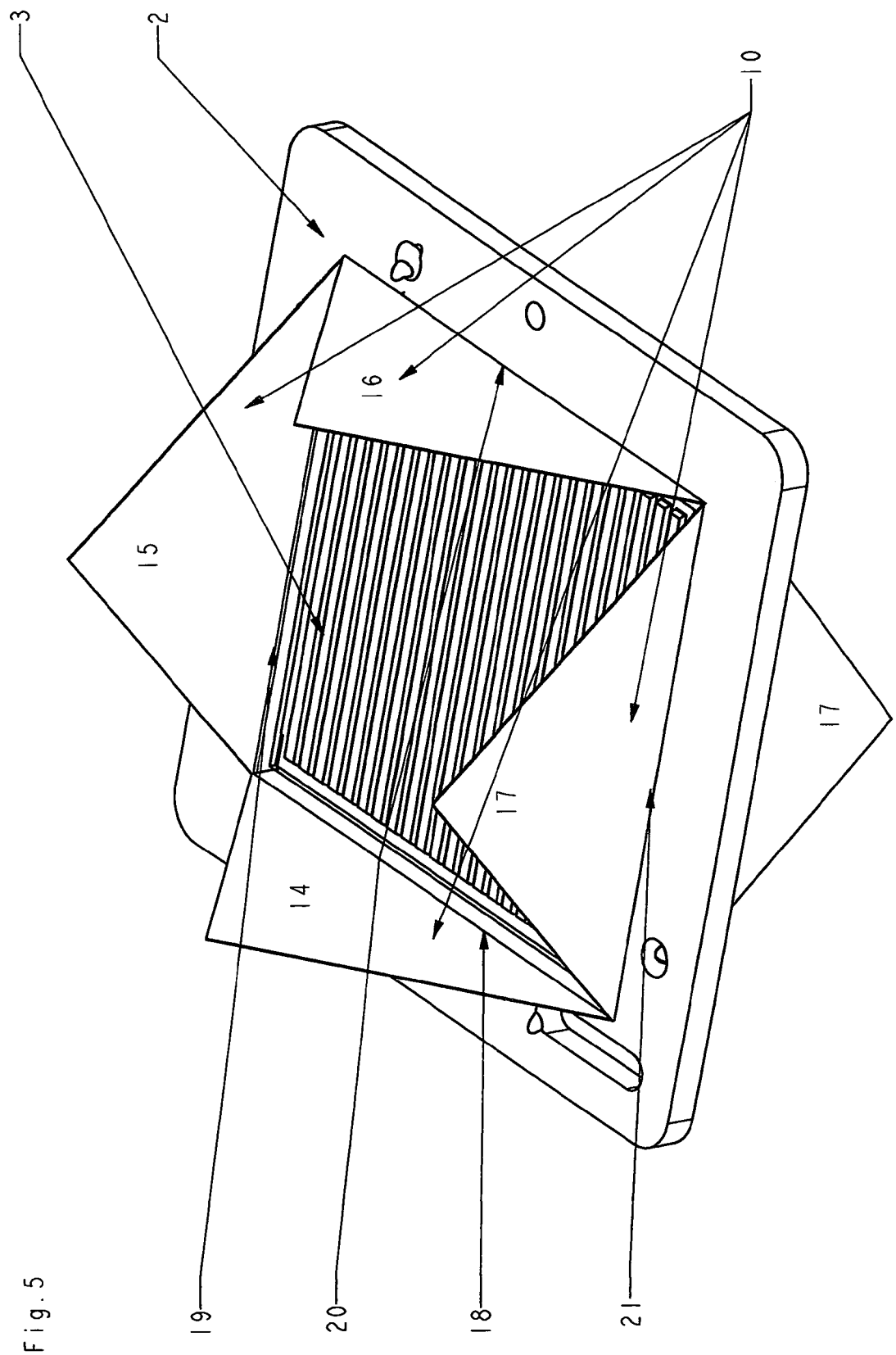

The present invention is explained in more detail with reference to the drawing, in which:

FIG. 1 shows an embodiment of a bipolar plate according to the invention fabricated in accordance with the method according to the invention, FIG. 2 shows the fabric being bent back on both sides, FIG. 3 shows the finished bipolar plate according to the invention in accordance with FIG. 1, FIG. 4 shows a further embodiment of a bipolar plate according to the invention fabricated in accordance with the method according to the invention, and in which the fabric is inserted as a number of pieces at various points of the inner bipolar region and FIG. 5 shows a further embodiment of a bipolar plate according to the invention fabricated in accordance with the method according to the invention.

FIG. 1 shows an embodiment of a bipolar plate according to the invention fabricated in accordance with the method according to the invention.

The bipolar plate 1 comprises a circumferential frame 2 and an inner bipolar plate region 3 made from an electrically non-conductive material, preferably one of the abovementioned polymer materials. The frame 2 and the inner bipolar plate region 3 are preferably molded integrally and in one process step from the non-conductive material by means of an injection-molding process.

The frame 2 has channels for supplying and discharging liquids and gases. Via a first inlet 4, $H_2$ can be fed in, for example. The hydrogen is then distributed during fuel cell operation on the anode side via the channels 5 (flow-field) onto the surface of the inner bipolar plate region 3. The hydrogen not consumed in the fuel cell reaction is in turn discharged via the first outlet 6. Likewise, a second inlet 7 and a second outlet 8 exist for the other gas taking part in the fuel cell reaction (e.g. $O_2$) which is passed via the channels (not visible in FIG. 1) on the cathode side along the surface of the inner bipolar plate region. In addition, the frame 2 contains further channels (not shown) for a coolant which flows through the interior of the inner bipolar plate region 3. Furthermore, frame 2 contains openings 9 which are designed for mounting the bipolar plate 1 in the fuel cell stack.

In the preferred embodiment of the present invention shown in FIG. 1, an electrically conductive fabric 10 is inserted in one piece at the edge of the inner bipolar plate region 3. In this arrangement, the fabric 10 penetrates the electrically non-conductive material at the edge of the inner bipolar plate region 3 and extends perpendicularly on both sides beyond the latter, the surface area of the fabric projecting on each side of the bipolar plate 1 essentially corresponding to the area of the inner bipolar plate region 3 made of electrically non-conductive material on that side. The fabric is preferably a wire mesh made of nickel, nickel alloys or alloyed steel, the wire thickness, mesh size and type of fabric being dependent on the electrical power to be transmitted.

FIG. 2 shows the fabric being bent back on both sides.

This figure is intended to illustrate step D) of the method according to the invention. The fabric 10 extending on both sides beyond the inner bipolar plate region 3 made of the electrically non-conductive material is bent back along the bending edge 11 in the bending direction 12 so as to cover the inner bipolar plate region 3.

FIG. 3 shows the finished bipolar plate according to the invention in accordance with FIG. 1.

After the fabric 10 has been bent back (as shown in FIG. 2) along the bending edge 11, it closely fits the electrically non-conductive material, completely covering the latter, in the inner bipolar plate region 3 in the finished bipolar plate 1. If required, the fabric 10, having been bent back, is additionally fastened to the inner bipolar plate region 3 (e.g. at the edges 13) or alternatively to the frame 2, so that it will be permanently fastened to the bipolar plate even before the fuel cell stack is assembled.

FIG. 4 schematically shows a further embodiment of a bipolar plate according to the invention fabricated according to the method according to the invention.

In this preferred embodiment of the present invention, the electrically conductive fabric 10 is introduced as a plurality of pieces at various points of the inner bipolar plate region 3 surrounded by the frame 2. Four quadrangular pieces 14, 15, 16, 17 of the fabric 10 extend perpendicularly on both sides beyond the inner bipolar plate region 3 made of electrically non-conductive material. The areas of the pieces of fabric extending beyond the inner bipolar plate region 3 correspond in sum to the not (yet) covered surface area of the inner bipolar plate region 3. The pieces of fabric 14, 15, 16, 17 are distributed, parallel and equidistantly with respect to one another, across the inner bipolar plate region 3. The bipolar plate 1 was obtained in this state by carrying out steps A) through C) of the method according to the invention. Then the quadrangular pieces of fabric 14, 15, 16, 17 are bent back on both sides along their bending edges 18, 19, 20, 21, in accordance with process step D), in the bending direction 12, causing them to cover completely the inner bipolar plate region 3 made of non-conductive material. The finished bipolar plate 1 consequently includes through-connections in the four regions in which the four pieces of fabric 14, 15, 16, 17 extend through the electrically non-conductive material.

FIG. 5 schematically shows a further embodiment of a bipolar plate according to the invention which is fabricated in accordance with the method according to the invention.

In this embodiment of the bipolar plate 1 according to the invention, the inner bipolar plate region 3 likewise contains the electrically conductive fabric 10 as a plurality of pieces 14, 15, 16, 17. In this arrangement, the four quadrangular pieces of fabric, 14, 15, 16, 17 each intersect the inner bipolar plate region 3 along one of its edges delimited by the frame 2. The pieces of fabric 14, 15, 16, 17 penetrate the electrically non-conductive material in the area of one of their diagonals, thus causing triangular pieces of fabric to extend perpendicularly beyond the inner bipolar plate region 3. These triangular pieces of fabric are each bent back along a bending edge 18, 19, 20, 21 toward the center of the inner bipolar plate region 3 in order to finish the bipolar plate 1 according to the invention. Here, the sum of the triangular areas corresponds to the total surface area of the inner bipolar plate region 3, causing the latter to be completely covered by fabric 10 after the bending-back operation.

The through-connection of the bipolar plate 1 in this embodiment are in the edge zone of the inner bipolar plate region 3.

LIST OF REFERENCE SYMBOLS

1 Bipolar plate
2 Frame
3 Inner bipolar plate region
4 First inlet ($H_2$)
5 Channels
6 First outlet ($H_2$)
7 Second inlet ($O_2$)
8 Second outlet ($O_2$)
9 Openings
10 Electrically conductive fabric
11 Bending edge
12 Bending direction
13 Edges
14 First quadrangular piece of fabric
15 Second quadrangular piece of fabric
16 Third quadrangular piece of fabric
17 Fourth quadrangular piece of fabric
18 First bending edge
19 Second bending edge
20 Third bending edge
21 Fourth bending edge

We claim:

1. A method of fabricating a bipolar plate for fuel cell stacks, wherein the bipolar plate includes a circumferential frame made of an electrically non-conductive material and further includes an inner bipolar plate region which is enclosed by the frame, wherein the inner bipolar plate region is made of the electrically non-conductive material and comprises channels for gases and, optionally, for coolants, said method comprising the following procedural steps:
   A) inserting an electrically conductive fabric, which essentially extends in two dimensions, into a tool for fabricating the bipolar plate, the fabric being inserted such as to be essentially perpendicularly to the orientation of the bipolar plate to be fabricated and extending on both sides beyond the bipolar plate to be fabricated,
   B) introducing of the electrically non-conductive material into the tool in order to form the frame and the inner bipolar plate region, the electrically non-conductive material extending through the fabric, thereby containing the fabric,
   C) removing a molded bipolar plate from the tool, and
   D) bending back on both sides the fabric which extends beyond the inner bipolar plate region so as to cause the fabric to cover the inner bipolar plate region made of the non-conductive material.

2. The method as claimed in claim 1, wherein the fabric, having been bent back in step D) is at least partially fastened to the inner bipolar plate region made of non-conductive material.

3. The method as claimed in claim 1, wherein the electrically non-conductive material in step B) is introduced into the tool or is molded, respectively, by injection molding.

4. The method as claimed in claim 1, wherein the non-conductive material is a thermoplastic or a thermosetting plastic.

5. The method as claimed in claim 1, wherein the non-conductive material is a polymer selected from the group consisting of PPS, LCP, POM, PAEK, PA, PBT, PPO, PP and PES.

6. The method as claimed in claim 1, wherein the fabric is a wire mesh made of at least one material selected from the group consisting of nickel, nickel alloys and high-alloy steel.

7. The method as claimed in claim 1, wherein the fabric, in step B) is inserted in one piece at the edge of the inner bipolar plate region.

8. The method as claimed in claim 1, wherein the fabric, in step B) is inserted as a plurality of pieces at various positions of the inner bipolar plate region.

* * * * *